United States Patent Office 3,527,351
Patented Sept. 8, 1970

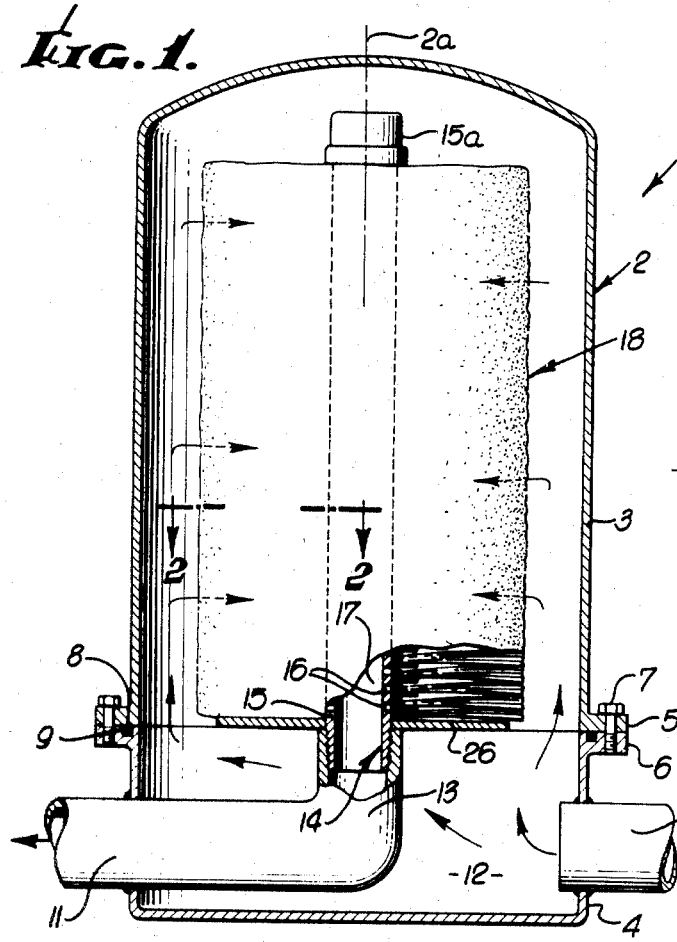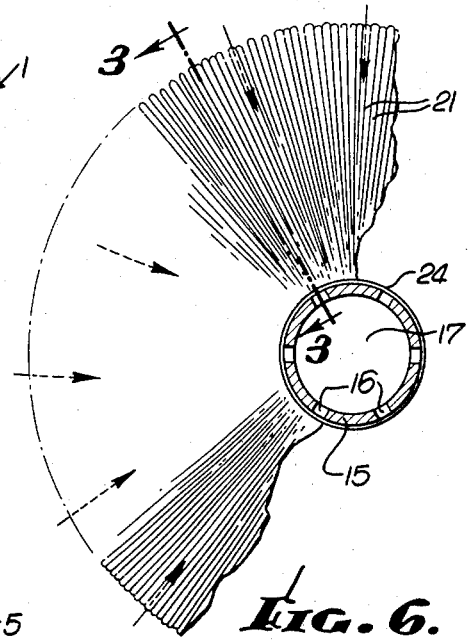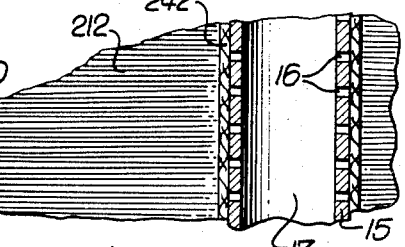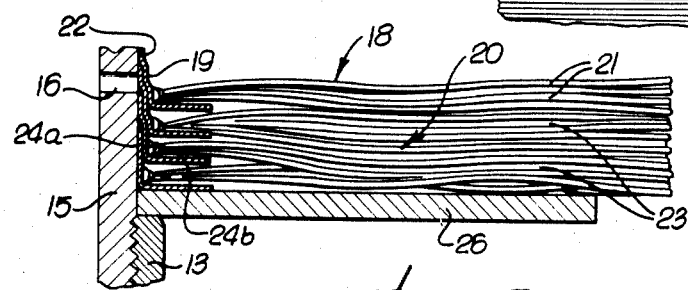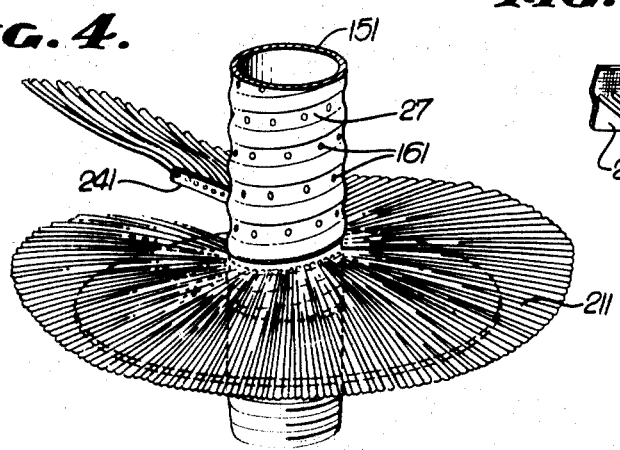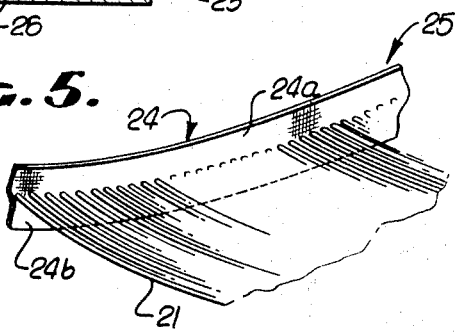

3,527,351
FLUID FILTERING APPARATUS
Charles E. Wade, Covina, Calif., assignor to Purex Corporation, Ltd., Lakewood, Calif., a corporation of California
Filed Jan. 9, 1969, Ser. No. 790,133
Int. Cl. B01d 25/20, 25/34, 33/30
U.S. Cl. 210—356                                    20 Claims

ABSTRACT OF THE DISCLOSURE

Filter device for filtering swimming pool water and the like to separate finely divided matter therefrom over long periods without clogging or undue pressure drop which includes a filter element comprising a rigid liquid passing member such as an apertured pipe and a filter fabric supported by the element carrying a filter body adapted for separating finely divided matter from liquid passing therethrough and on which separated matter may accumulate. To prevent clogging accumulations multiple elongate and flexible strands secured at their inner ends to outwardly project from the filter fabric comprise the body and have responsive movement throughout their length to fluid pressure of liquid passing to the filter element. The strands by their movement operate to continually disrupt the integrity of separated matter accumulations on the filter body.

BACKGROUND OF THE INVENTION

Field of the invention

In the filtration of liquids the problems of efficient separation of unwanted matter from swimming pool water have continued to exist despite numerous innovations aimed at resolution of the conflicting requirements of ever finer filtration, minimum pressure drop across the filter device, infrequency and ease of maintenance and low cost.

Prior art

Basic filter units are of the sand type or filter leaf type. In the former a bed of sand is used to separate finely divided material from water and in the latter a porous coating of diatomaceous earth or other "filter aid" on a supporting porous cloth is used as a filter medium. In both types of devices separated matter accumulations with more or less time plug the filter and require backflushing, a task not welcomed by the pool owner. In backflushing the accumulations are swept from the filter device by a churning agitation of the filter medium be it sand or a filter aid. Periodically the supply of filter aid moreover must be replenished.

SUMMARY OF THE INVENTION

Accordingly, it is an object of this invention to provide a filter device which operates without sand, filter aid or other expendable particulate material as the filter medium. Moreover the present invention is intended to provide a unique form of filtering means and one which is self-purging against plugging by separated matter accumulations, rendering intervals between backflushing of greater duration.

These and other purposes of the invention are realized by provision of a filter device for separating finely divided matter from liquids which comprises a housing having an inlet and an outlet for liquid passage and a filter element arranged to filter liquid passing between the inlet and the outlet. The filter element includes a rigid liquid passing member and a porous filter body terminating inwardly in a filter fabric supported by the element and adapted for separating finely divided matter from liquid passing therethrough. The separated matter may tend to accumulate on the surfaces of the filter body and fabric in a manner tending to plug the fabric against liquid passage. To overcome this, the filter body is comprised of multiple elongate and flexible strands secured at their inner ends, e.g. to the filter fabric. The strands project outwardly from the filter fabric in a manner to have responsive movement throughout their length to fluid pressure generated by liquid passing to the filter element to continually disrupt the integrity of separated matter accumulations thus to prevent plugging of the filter device by said accumulations.

The rigid liquid passing member of the filter element typically comprises a pipe having an elongated and apertured liquid passing extent. The filter fabric may be woven or nonwoven and liquid flow therethrough is desirably reversible between inlet and outlet to backwash the filter device.

The multiple strands typically are closed spaced and massed about the filter element to exert a filtering effect and may be formed of more or less porous material which becomes limp in water. The strands are secured at their inner ends in a manner such that the full length of all the strands beyond their inner ends is freely deflectable by liquid flow therepast and contiguous strands are inter-engageable substantially throughout their length.

In one preferred form, the present filter device comprises a housing having an inlet and an outlet, a filter element within the housing including a pipe having an elongated apertured fluid passing extent, a universally mobile body in local portions of freely flexible strands which may be in essentially cylindrical brush-like form and extend radially about the pipe with their inner ends attached thereat, liquid normally flowing from the inlet radially inwardly through the strand body in the pipe but the liquid flow being reversible to backwash the device, the full lengths of all the strands beyond their inner ends being freely deflectable by both normal and backwash flow through the strand body and contiguous strands being interchangeable substantially throughout the strand lengths continuously throughout the axial extent of the body corresponding to the total apertured fluid passing extent of the pipe. A major radial extent of the strand body may be supported at one end thereof by suitable means, leaving the opposite end of the body relatively unsupported, the strands themselves being restrained against deflection only by contacting strands.

In particular embodiments the housing is vertically extended and has its inlet formed in the base periphery thereof and the outlet extending from the base center in open communication with the pipe which may thus extend axially of the housing and centrally of the strand body. The strand body may be formed of a relatively narrow strand bearing strip arranged in multiple adjacent turns about the axis of the filter element, e.g. helically and optionally in a preformed groove or recess. The pipe support for the filter fabric, which may be comprised of the strand bearing web, may have plural helically arranged apertures formed therein with the web wound about the pipe to cover the pipe apertures.

BRIEF DESCRIPTION OF THE DRAWINGS

FIG. 1 is a view in vertical section of one embodiment of the present filter device;

FIG. 2 is a view of the strand body and supporting liquid passing element somewhat enlarged and taken on line 2—2 in FIG. 1;

FIG. 3 is an enlarged fragmentary view of the strand body taken on line 3—3 in FIG. 2;

FIG. 4 is a fragmentary view of one form of strand body formation with a stranded strip about the filter element axis;

FIG. 5 is an enlarged detail view in perspective of the stranded strip shown in FIG. 4; and FIG. 6 is a view in vertical section of an alternate form of strand body formation.

DESCRIPTION OF THE PREFERRED EMBODIMENTS

Water in swimming pools tends to constantly entrap or accumulate finely divided foreign matter owing to the nature of swimming pool use, the normal outdoor location of swimming pools, and the inherent tendency of swimming pool water to support the growth of algae and bacteria. Typical examples of foreign matter which tend to accumulate in the water of swimming pools are dust, dirt, leaves and the like; oils such as hair oils and suntan lotion; algae; gelatinous materials resulting from the interaction of chemicals of various sorts which are used to treat pool waters; and insoluble salt products resulting from the chemical reaction between the chlorine and other reactive materials employed to treat the water. For reasons of health, safety and appearance, it is essential to minimize such water pollutants. This is generally accomplished by mechanical filtration. Such mechanical filtration generally involves the passage of the swimming pool water through a filtering medium such as sand or a porous element coated with diatomaceous earth or other expendible filter aid as above described.

A major problem is that the separated matter from the pool water passing through the filter tends to cake on the upstream surface of the filtering medium. The cake gradually increases in thickness and density, and, as a consequence, presents increasing resistance to water flow through the filter. Frequent servicing of the filters, as by backwashing, spinning the filter element, or otherwise removing the cake of foreign matter, is thus necessary to periodically restore the filters to their proper operating condition. In those filters which utilize a coating of diatomaceous earth or other filter aid on a porous filter element as the filtering medium, periodic servicing of the filters also requires recoating of the element with fresh filter aid.

The present filter as indicated requires no such filter aid. In this regard, a significant and highly important feature of the illustrated and preferred embodiment of the invention resides in the fact that the filter strands serve a function similar to that performed by the filter aid in a conventional swimming pool filter, but in a very different manner. Thus, in the illustrated embodiment, the apertures in the central member that supports the body of filter strands are covered by a porous filter fabric which, in turn, is surrounded by the mass of filter strands. Accordingly, the incoming water flows first through the massed strands and then through the filter fabric to the interior of the central member. As a consequence, finely divided matter entrained in the incoming water may be removed by the strands prior to passage of the water through the porous filter fabric, whereby the apertures in the central member remain unblocked. Unlike conventional swimming pool filters, moreover, it is unnecessary to recoat the porous filter fabric with filter aid after each servicing of the filter. The present filter, therefore, may be more quickly and easily serviced or cleaned than the conventional filters. Also, as noted earlier, the filter strands undergo a continuous relative movement which produces cracks or fissures in the cake of accumulated matter on the surface of the massed strands, whereby the interstrand passages are continually reopened to water flow therethrough.

With reference now to the drawings, the filter device 1 illustrated particularly in FIGS. 1, 2, 3 and 6, includes a normally upright and water tight vertically extended housing 2 having separable upper and lower sections 3 and 4 respectively with abutting flanges 5 and 6. The housing sections 3, 4 are releaseably joined by bolts 7 which extend through the flange 5 in the upper section and are threaded in the flange 6 of the lower section. A resilient seal ring or gasket 8, contained in a seal groove 9 in the lower flange 6, provides a water tight joint between the flanges 5, 6. Housing 2 has a lower liquid inlet 10 and a lower liquid outlet 11. Inlet 10 opens directly to the interior 12 of the housing 2. The inner end 13 of the outlet 11 extends upwardly along the axis 2a of the housing 2 to support filter element tubular member 14 shown as pipe 15, having apertures 16, threaded onto outlet inner end 13. The central passage 17 within the pipe 15 is disposed in direct communication with the filter outlet 11 and communicates to the interior of the filter housing 2 through the apertures 16. The upper end of pipe 15 is closed as by cap 15a.

Supported on the pipe 15, in overlying relation to apertures 16, is a filtering means 18. This filtering means 18 includes an inner porous filter fabric 19 which covers the apertures 16 in the pipe 15 and an outer relatively compact mass 20 of filter strands 21. As will appear presently, the filter strands 21 extend generally normal to the exterior surface 22 of pipe 15 and define a multiplicity of small variable passageways 23 which communicate with the apertures 16 in the pipe. Apertures 16 are spaced circularly about the pipe 15 and along the length thereof FIGS. 1, 2 and 6 or the spacing of apertures 16 may be helical as shown in FIG. 4 drawings and are of a size to freely pass water under pressure. The filter fabric 19 is selected to be pervious to water being filtered but impervious to finely divided matter which may be carried in the water entering the filter device.

During operation of the filter device 1, the incoming water under pressure from a pump upstream not shown enters the filter housing 2 through its inlet 10. The water flows inwardly through the interstrand passageways 23 in the filter strand mass 20 and then through the filter fabric 19 and apertures 16 to the central passage 17 in pipe 15. The filtered water emerges from the filter device through the outlet 11. Finely divided, solid or gelatinous, matter entrained in the incoming water is filtered out when the water enters the interstrand passageways 23 and is deposited on the surfaces of the strands 21. A minor amount of such foreign matter may proceed through the passageways 23 and eventually reach the pipe 15. At this point, further movement of the foreign matter through the filter device 1 is blocked by the porous filter fabric 19 which overlies the ports 16 in the pipe 15. Most of the foreign matter, however, is deposited on the body 20 of filter strands and produces a cake which gradually increases in thickness as water continues to flow through the filter device 1. This cake of foreign matter may tend to block flow through the filter device 1. A unique feature of the invention resides in the fact that the outer free end portions of the filter strands 21 undergo generally continuous relative movement under the action of the fluid flowing through the filter. This relative movement is effective to produce cracks or fissures in the cake of foreign matter and, thereby, to reopen the interstrand passageways 23 to fluid flow. As a consequence, the filter may be operated for prolonged intervals of time without cleaning. When cleaning is eventually required, it may be accomplished by simply backwashing the filter.

The porous filter fabric 19 comprises woven or nonwoven natural or synthetic fibers arranged to form a porous cloth-like material. In a preferred form the fabric comprises a narrow band or strip 24 of fabric able to be spirally wound about the pipe 15 and secured thereto in any convenient way, as by adhesively bonding the strip to the pipe. The fabric strip 24 overlies the apertures 16 in the pipe, whereby water flowing through the filter device 1 first passes through the porous strip 24. As best shown in FIGS. 3 and 4 the fabric strip 24 may be wound about the pipe 15 so that a first edge margin 24a of the strip lies agains the pipe and the other edge margin 24b overlaps the next adjacent first edge margin and is spaced thereby from the pipe. This method of winding the fabric strip 24 is preferred for the reason that the filter strands 21 carried by the strip as will be described with the propinquity of the strip turns are thus located in close proximity to one another, and the number of strands per unit volume is maximized. The filtering efficiency of the filter device 1 is thereby increased.

The filter strands 21 are typically constructed of yarn, natural or synthetic heavy string, monofilaments, or other similar elongated, thin, flexible and/or fibrous material which is chemically resistant to the liquid being filtered. As shown best in FIG. 5, the filter strands 21 are anchored at their inner ends to the inner filter strip 24. This anchoring of the filter strands 21 to the strip 24 may be accomplished in any convenient way, as by stitching, adhesive, or the like or the strands may be fastened otherwise at their inner end e.g. to the pipe itself. Preferably, the strip and filter strands 21 are formed together as a fringed structure 25 which may be economically produced. When the fringe structure 25 is wrapped about the pipe 15 (FIG. 3), the filter strands 21 extend normally of the pipe surface 22 and generally radially of the pipe and are disposed in close proximity to one another to form the relatively compact mass or body 20 of strands 21. As an illustration, the filter strip 24 in a typical filter device according to the invention is about one inch in width, is wound to have a spacing between successive edge margins 24a of about ⅛ inch. The strip 24 typically contains eight filter strands per linear inch, the filter strands being about ⅛ inch in diameter. In this typical filter, the filter strands are composed of yarn, preferably Dacron yarn, of a loose type. Centrally mounted on the lower end of the pipe 15 is a transverse plate 26 which vertically supports the body 20 of filter strands 21 when the filter is in its normally upright, operating position.

The modified internal filter structure shown in FIG. 4 is similar to that described above except that the pipe 151 has an external spiral groove 27 in which the apertures 161 are formed and in which the filter strip 241 carrying filter strands 211 is wound. In this case, the adjacent turns of the filter strip do not overlap as they do in the filter structure earlier described.

In FIG. 6, the inner porous filter material 242 comprises a porous sleeve which is fitted over the filter pipe 15. The filter strands 212 are secured to and extend radially from this sleeve.

It is now evident that the filter body 20 defines a multiplicity of relatively narrow and greatly extended passageways 23 which are variably defined by relatively movable boundary elements, i.e., the filter strands 21, and which communicate at their inner terminus, through the filter fabric 19, to the apertures 16 in the pipe 15. The pressure on the body of strands during operation of the filter tends to mat, compact and/or compress the strand body 20 radially in such a way as to further restrict the vertical cross sectional area of the interstrand passageways 23. This radial matting or compression of the strands occurs most predominantly when the entering fluid is a liquid, such as swimming pool water. In this latter case, the filter strands also swell to some degree, thereby still further restricting the passageways 23 through the body 20. The end result, therefore, is to produce a relatively compact mass of filter strands which is relatively pervious to the incoming water but relatively restrictive of passage of finely divided foreign matter entrained in the water. Accordingly, the entrained matter is filtered out and deposited, as a cake, on the strand body 20. As noted earlier, this cake with time gradually increases in thickness and thereby increasingly blocks fluid flow through the filter.

A signal feature of the present filter device is that the boundary elements of the fluid passages through the filter body 20, i.e. the filter strands 21, are independently movable and thus relatively movable under the action of the water flowing through the filter device 1. This movement of the boundary elements or filter strands is caused, in part, by the motion of the fluid and, in part, by the pressure variations which arise within the body 20 of filter strands as a result of blockage of the interstrand passageways 23 by foreign matter. Thus, as the cake of foreign matter on a particular portion of the body 20 increases in thickness, the pressure differential across the cake at that point, and hence the inward pressure or force on the adjacent filter strands 21, increases. This increase in the inward force on the strands 21, occurs gradually and generally non-uniformly about the strand body 20 and causes a slow relative movement of the strands. The fluid motion and fluid pressure induced relative movement of the filter strands produces cracks or fissures in the cake of foreign matter to reopen the adjacent interstrand passageways 23 to flow. Relative movement of the filter strands 21, and resultant reopening of the interstrand passageways 23, occurs generally continuously during operation of the present filter and thus reduces the rate at which the filter device 1 is clogged by the accumulated matter. Accordingly, the present filter may be operated for prolonged intervals of time without cleaning. Eventually, of course, the filtered foreign matter may work itself through the body of filter strands 21 to the underlying, porous filter fabric 19 and block flow through this member. Also, the cake of foreign matter on the strand body 20 will eventually increase to such a thickness as to require cleaning of the filter. This may be accomplished by admitting water or other fluid under pressure to the outlet 11 so as to backwash the filter strands 21. This backwashing also restores the filter strands to their normal radial position relative to the pipe 15, and reconditions the strands for subsequent filtering.

It is noteworthy that the present filter requires no diatomaceous earth or other so-called expendable filter aid. The body 20 of filter strands 21 performs a function similar to that performed by the filter aid in a conventional filter. In other words, the filter strands 21 provide a filtering medium upstream of the porous filter fabric 19, which filtering medium traps the major portion of the entering foreign matter and may be conveniently cleaned by backwashing. In contrast to conventional filters, however, this filtering medium is not temporary, and need not be recoated, like the expendable diatomaceous earth or other filter aid employed in the conventional filters. The present filter device, therefore, may be more quickly and easily serviced than conventional filters. Another obvious advantage of the present filter resides in its simplicity of construction and economy of manufacture which particularly adapt the filter to use in inexpensive swimming pool filter systems, such as those used with above ground, reinforced plastic membrane type swimming pools. As noted earlier, however, and as is now obvious, the present filter is susceptible of general application for filtering any fluid.

I claim:

1. Filter device for separating finely divided matter from liquids which comprises a housing having an inlet and an outlet for liquid passage and a filter element arranged to filter liquid passing between the inlet and outlet, said filter element including a rigid liquid passing member and porous filter body terminating inwardly in a filter fabric supported by the element adapted for separating finely divided matter from liquid passing therethrough, said separated matter tending to accumulate on the surfaces of the filter body and fabric in a manner tending to plug the body and fabric against liquid passage, said body comprising multiple elongate and flexible strands secured at their inner ends and outwardly projecting from the filter fabric, the full length of all said strands beyond their inner end being freely deflectable by liquid flow therepast to have responsive movement throughout their length to fluid pressure generated by liquid passing to the filter element to continually disrupt the integrity of separated matter accumulations thus to prevent plugging of the filter device by said accumulations.

2. Filter device according to claim 1 in which said rigid liquid passing member comprises a pipe having an elongated and apertured liquid passing extent.

3. Filter device according to claim 1 in which liquid flow between said inlet and outlet is reversible to backwash the filter device.

4. Filter device according to claim 1 in which said filter fabric is woven.

5. Filter device according to claim 1 in which said filter fabric is nonwoven.

6. Filter device according to claim 1 in which said strands are closely spaced and massed about said filter element.

7. Filter device according to claim 1 in which contiguous strands are interengageable substantially throughout their length.

8. Filter device according to claim 1 in which said filter fabric comprises a relatively narrow strip of fabric wrapped in multiple turns about said rigid member.

9. Filter device according to claim 1 in which said strands are formed of porous material which becomes limp in water.

10. Filter device according to claim 1 in which local portions of the filter body are universally mobile.

11. Filter device comprising a housing having an inlet and an outlet, a filter element within the housing including a pipe having an elongated apertured fluid passing extent and a locally mobile mass of freely flexible strands extending about said pipe and having their inner ends secured, liquid normally flowing from said inlet inwardly through the strand mass into said pipe but the liquid flow being reversible to backwash the device, the full lengths of all the strands beyond their said inner ends being freely deflectable by both normal and back wash flow through the strand mass and contiguous strands being interengageable substantially throughout said lengths continuously throughout the axial extent of said mass corresponding to the total apertured fluid passing extent of the pipe.

12. Filter device according to claim 11, including means supporting a major radial extent of one end of said mass, the opposite end thereof being relatively unsupported.

13. Filter device according to claim 11 in which said strands are of porous material which becomes limp in water and is restrained against deflection only by contacting strands.

14. Filter device according to claim 11 in which said strands are arranged radially about said pipe in essentially cylindrical brush-like form.

15. Filter device according to claim 10 in which said housing is vertically extended, said inlet is formed in the base periphery of the housing and said outlet extends from the base center of said housing in open communication with said pipe.

16. Filter device according to claim 15 in which said pipe extends centrally of the strand mass and axially of said housing.

17. Filter device according to claim 16 including also a strand bearing relatively narrow strip arranged in multiple adjacent turns about the axis of the filter element.

18. Filter device according to claim 17 in which said filter fabric comprises said strip.

19. Filter device according to claim 18 in which said pipe has plural helically arranged apertures formed therein and said strip is wound about the pipe to cover said apertures.

20. Filter device according to claim 19 in which said pipe apertures are formed in a helically extending recess in the pipe exterior surface.

References Cited

UNITED STATES PATENTS 2,468,354   4/1949   Abbrecht _____ 210—350

JAMES L. DE CESARE, Primary Examiner

U.S. Cl. X.R.

210—440, 457, 488